(12) United States Patent
Ogawa

(10) Patent No.: US 11,481,324 B2
(45) Date of Patent: Oct. 25, 2022

(54) STORAGE CONTROL DEVICE, STORAGE MEDIUM AND STORAGE CONTROL METHOD

(71) Applicant: FUJITSU LIMITED, Kawasaki (JP)

(72) Inventor: Junichi Ogawa, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 17/173,240

(22) Filed: Feb. 11, 2021

(65) Prior Publication Data

US 2021/0326256 A1  Oct. 21, 2021

(30) Foreign Application Priority Data

Apr. 21, 2020 (JP) .............................. JP2020-075226

(51) Int. Cl.
| | |
|---|---|
| *G06F 11/00* | (2006.01) |
| *G06F 12/0804* | (2016.01) |
| *G06F 3/06* | (2006.01) |
| *G06F 11/10* | (2006.01) |

(52) U.S. Cl.
CPC .......... *G06F 12/0804* (2013.01); *G06F 3/065* (2013.01); *G06F 3/0619* (2013.01); *G06F 3/0653* (2013.01); *G06F 3/0659* (2013.01); *G06F 3/0673* (2013.01); *G06F 11/1008* (2013.01); *G06F 2212/1032* (2013.01)

(58) Field of Classification Search
CPC ......... G06F 11/1008; G06F 2212/1032; G06F 3/0619
USPC ......................................................... 714/1–57
See application file for complete search history.

(56) References Cited

U.S. PATENT DOCUMENTS

| | | | |
|---|---|---|---|
| 2017/0177217 A1 | 6/2017 | Kanno | |
| 2017/0250537 A1* | 8/2017 | Takatsuka | ............. H02J 7/0068 |
| 2019/0163553 A1* | 5/2019 | Ramegowda | ....... G06F 16/3344 |
| 2019/0279689 A1* | 9/2019 | Confalonieri | ...... G11C 13/0033 |
| 2020/0004637 A1* | 1/2020 | Zhou | ..................... G06F 3/0685 |
| 2021/0089227 A1* | 3/2021 | Yamazaki | ............. G06F 3/0653 |

FOREIGN PATENT DOCUMENTS

| | | |
|---|---|---|
| JP | H09-330277 A | 12/1997 |
| JP | 2011-254660 A | 12/2011 |
| JP | 2017-117054 A | 6/2017 |

* cited by examiner

*Primary Examiner* — Sarai E Butler
(74) *Attorney, Agent, or Firm* — Fujitsu Patent Center

(57) ABSTRACT

A storage control device, includes a memory; and a processor coupled to the memory and the processor configured to: identify a storage device to store a target data to be backed up, generate relational information which indicates a relationship between a write data size, an environmental temperature, and write loads by using write performance of the storage device when an operation of the storage control device is normal, and when storing the target data in the storage device, determine one of the write loads by using the relational information.

5 Claims, 7 Drawing Sheets

STORAGE CONTROL DEVICE, STORAGE MEDIUM AND STORAGE CONTROL METHOD

CROSS-REFERENCE TO RELATED APPLICATION

This application is based upon and claims the benefit of priority of the prior Japanese Patent Application No. 2020-75226, filed on Apr. 21, 2020, the entire contents of which are incorporated herein by reference.

FIELD

The embodiments discussed herein are related to a storage control device, a storage medium and a storage control method.

BACKGROUND

Storage devices such as redundant arrays of inexpensive disks (RAID) systems include controller modules (CMs). A solid state drive (SSD) capable of backup is adopted for the CM. Hereinafter, the SSD mounted in the CM as a backup destination of memory data is sometimes referred to as a backup device (BUD). The CM performs various controls in the storage device. For example, the CM performs diverse controls such as access control to a storage module in accordance with an input/output (I/O) processing request from a host device (not illustrated).

The CM is configured as an information processing device including a processor and memory. When a power failure is detected in the CM, the cached data and the like in the memory is backed up in a nonvolatile storage device or the like.

Conventionally, a hard disk drive (HDD) has been adopted as a nonvolatile storage device used as a backup destination for the memory data in the CM.

In the event of a power failure, the CM operation firmware (FW), the system operation log, and memory backup data are stored in the BUD. Furthermore, in the CM, a configuration in which a plurality of BUDs is mounted is also known.

When the external power source is lost while the storage device is operating due to a power failure or the like, the CM writes the data stored in the memory at the time point when the power failure was detected, to the BUD while being supplied with power from a battery, and then stops the operation. In addition, the CM records the detected event in the BUD as a log event on a regular or irregular basis.

Besides, in general, the storage device includes a cooling fan for cooling each unit. In the control of the cooling fan, the temperature of the entire system area is calculated from the outside air temperature, the local temperature, and the measurement results at a plurality of points, and the temperature of each part is controlled so as not to exceed the standard value (threshold value). Examples of the disclosed related art include Japanese Laid-open Patent Publication No. 9-330277, Japanese Laid-open Patent Publication No. 2017-117054, and the like.

SUMMARY

According to an aspect of the embodiments, a storage control device, includes a memory; and a processor coupled to the memory and the processor configured to: identify a storage device to store a target data to be backed up, generate relational information which indicates a relationship between a write data size, an environmental temperature, and write loads by using write performance of the storage device when an operation of the storage control device is normal, and when storing the target data in the storage device, determine one of the write loads by using the relational information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
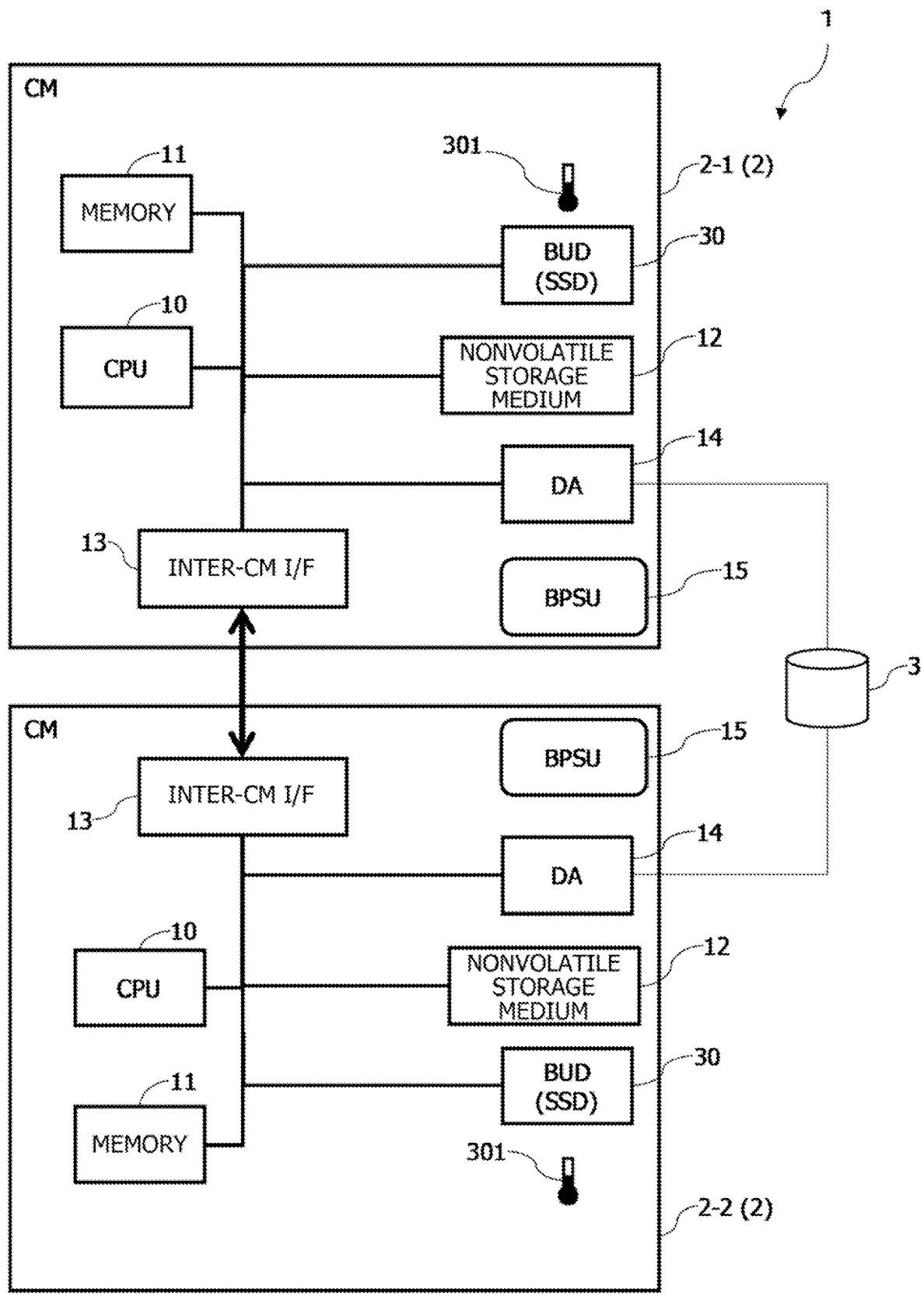
FIG. 1 is a diagram schematically illustrating a hardware configuration of a storage device in an example according to an embodiment.

In recent years, the consumed power and the amount of heat of SSDs have been increasing with the improvement of the performance of the SSDs. A NAND FLASH mounted on the SSD has the characteristic that the data retention capacity is deteriorated in a high temperature environment. Therefore, some SSDs are generally provided with a protection function called thermal throttling. The thermal throttling self-limits the I/O process under certain high temperature conditions to suppress heat generation.

The operation of the thermal throttling of the SSD is not allowed to be controlled directly from the RAID system. Furthermore, the conditions for activating the thermal throttling of an unknown SSD developed after system design are, of course, unknown.

In order to avoid the thermal throttling and operate the SSD with a desired performance, there is no choice but to cool the SSD, and conventionally, cooling control presuming the maximum amount of heat from the SSD is performed. In such cooling control presuming the maximum amount of heat from the SSD, not only the power consumed by the cooling fan is maximized, but also cooling is performed by the cooling fan even in the event of a power failure. For this reason, there is a problem that power consumption increases and inefficiency is caused by excessive fan cooling for the SSD.

In view of the above, it is desirable to efficiently use the storage module as a storage destination of the backup target data.

Hereinafter, an embodiment relating to a storage control device and a backup control program will be described with reference to the drawings. However, the embodiment to be described below is merely an example, and there is no intention to exclude application of various modifications and techniques not explicitly described in the embodiment. This means that the present embodiment may be modified in various ways to be implemented without departing from the spirit of the embodiment. Furthermore, each drawing is not intended to include only the constituent elements illustrated in the drawing, and may include other functions and the like.

(A) Configuration

Figure 2:
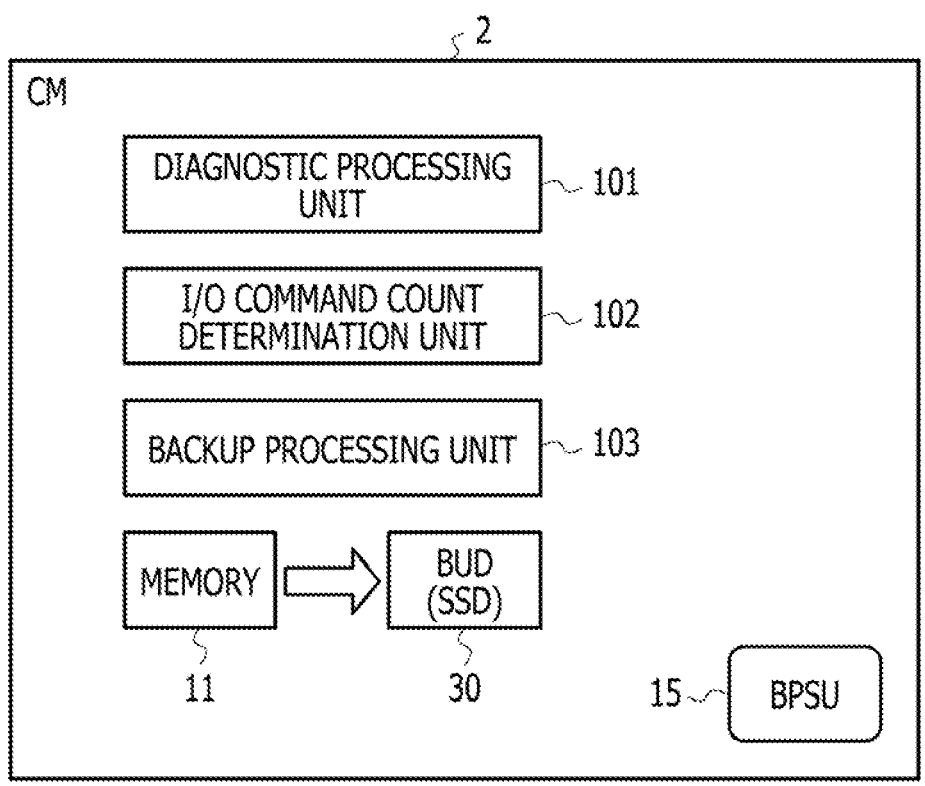
FIG. 2 is a diagram exemplifying a functional configuration of the storage device as an example according to the embodiment.

FIG. 1 is a diagram schematically illustrating a hardware configuration of a storage device 1 as an example of the embodiment, and FIG. 2 is a diagram exemplifying a functional configuration of the storage device 1 as an example of the embodiment.

The storage device 1 is an example of an information processing device, and can include one or more (two in the example illustrated in FIG. 1) CMs 2-1 and 2-2, and a storage 3 as exemplified in FIG. 1.

The storage 3 has a storage area to be provided to a host device or the like (not illustrated) by the storage device 1. For example, the storage 3 can include a plurality of disks (physical disks). For example, the storage 3 may constitute a disk array such as RAID with a plurality of disks.

The disk is a storage module such as an HDD, an SSD, and a storage class memory (SCM), and stores various kinds of data.

The CMs 2-1 and 2-2 are examples of storage control devices or control devices. The CMs 2-1 and 2-2 can, for example, control the storage device 1, and perform various controls for providing the storage area of the storage 3 to the host device. The CMs 2-1 and 2-2 have similar configurations. Hereinafter, in a case where the CMs 2-1 and 2-2 are not particularly distinguished, they are written as CM(s) 2.

The CM 2 may be, for example, a RAID controller that controls a storage device that constitutes a RAID system.

Note that, in the following description, a process relating to the access to the storage 3 executed by the CM 2 based on an access request to the storage 3 issued from the host device to the storage device 1 will be sometimes written as "host I/O".

As illustrated in FIG. 1, the CM 2 can illustratively include a CPU 10, a memory 11, a nonvolatile storage medium 12, an inter-CM interface (I/F) 13, a device adapter (DA) 14, and a backup power supply unit (BPSU) 15, and a BUD 30.

The memory 11 is an example of a volatile memory that stores various kinds of information used for the operation of the CM 2. In one embodiment, the memory 11 is a target (backup source) of backup executed when a power failure occurs in the storage device 1 (CM 2).

The memory 11 may store operation resumption information used for resuming the operation of the storage device 1 (CM 2) when the storage device 1 (CM 2) is restarted after a power failure, for example. Examples of the operation resumption information include control information for a process executed by the CM 2 immediately before the occurrence of a power failure, information on cache relating to the host I/O, and the like.

The inter-CM interface 13 performs data communication with another CM 2 by information communication between the CMs. For example, the inter-CM interface 13 can synchronize device configuration information and the like with another CM 2, and request a process to another CM 2. Note that the information communication between the CMs may be achieved by, for example, a communication function using a direct memory access (DMA) transfer technique. The inter-CM interface 13 may be appropriately changed when implemented, examples of which include a peripheral component interconnect express (PCIe) interface, an optical communication interface, a network interface, and the like.

The DA 14 is an interface for connecting to the storage 3 so as to enable communication. The disks of the storage 3 are connected to the DA 14, and the CM 2 controls access to these disks based on an I/O command received from the host device.

The BPSU 15 is a power supply device that supplies power to at least some parts of the CM 2 when the power supply from a power source device (not illustrated) is stopped in the storage device 1. Note that a state in which the power supply from the power source device is stopped will be sometimes simply referred to as a power failure.

The BPSU 15 supplies power to, for example, the CPU 10, the memory 11, the BUD 30, a memory controller (not illustrated) of the CM 2, and the like in the event of a power failure in the storage device 1.

The BPSU 15 includes a battery (not illustrated). This battery is, for example, a secondary battery such as a lead storage battery, a nickel hydrogen battery (Ni—H), or a lithium ion (Li-ION) battery. Note that, instead of the battery, a capacitor such as an electric double layer capacitor may be provided. The BUD 30 is a storage module that stores various kinds of information used for the operation of the CM 2, and in one embodiment, an SSD is used as a storage medium.

Hereinafter, the BUD 30 will be sometimes represented as an SSD 30. In one embodiment, the BUD 30 is a storage (retraction) destination (backup destination) of backup executed when a power failure occurs in the storage device 1 (CM 2). For example, in the event of a power failure in the storage device 1, the CM operation FW, the system operation log, and the memory backup data are stored in the BUD 30. The BUD 30 includes a storage unit that stores data.

Figure 3:
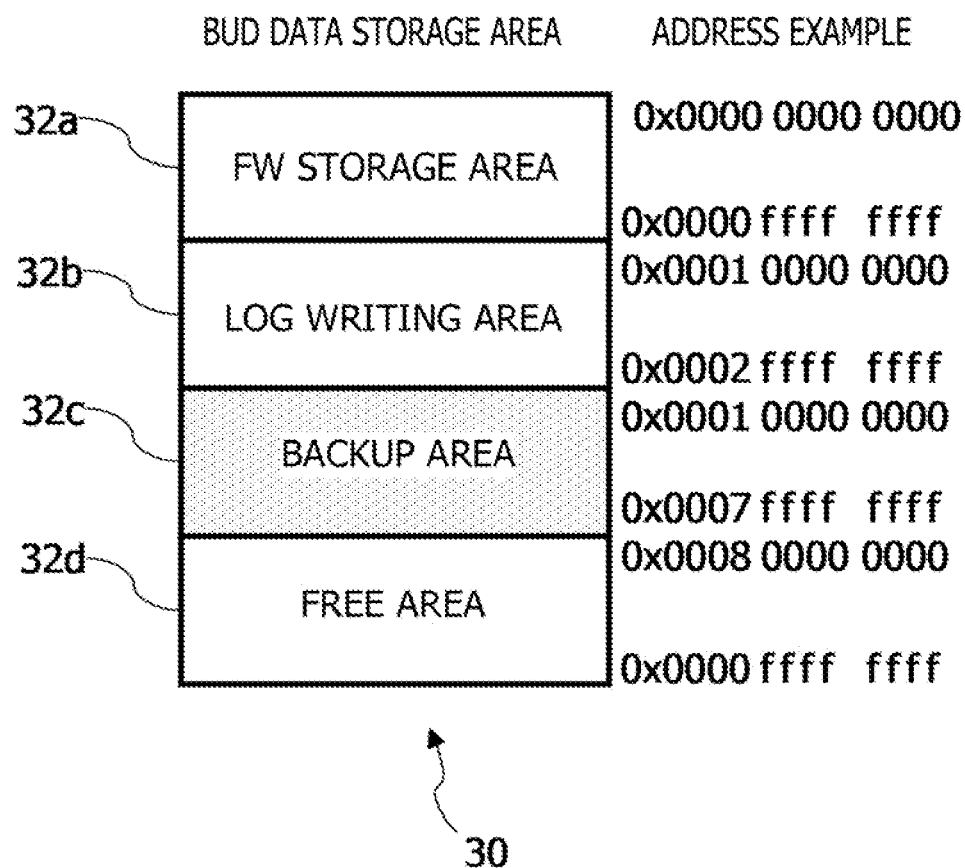
FIG. 3 is a diagram illustrating an exemplary data configuration of a storage unit of a BUD in the storage device as an example of the embodiment.

FIG. 3 is a diagram illustrating an exemplary data configuration of the storage unit of the BUD 30 in the storage device 1 as an example of the embodiment.

The storage unit of the BUD 30 is a storage area of the BUD 30, and can include a firmware (FW) storage area 32a, a log writing area 32b, a backup area 32c, and a free area 32d as logical blocks as exemplified in FIG. 2. Note that each of these areas 32a to 32d may be represented as a logical address range defined by consecutive logical addresses, as illustrated in FIG. 3 as an address example.

The FW storage area 32a is a storage area that stores firmware that achieves the operation of the CM 2. The log writing area 32b is a storage area that stores the system operation log and the like. The free area 32d is a storage area in which data has not been written.

The backup area 32c is a storage area into which data in the memory 11 is written during backup executed using power supplied from the BPSU 15 when a power failure occurs in the storage device 1 (CM 2). For example, data (cached data) in a cache memory area of the memory 11 is stored in the backup area 32c. Hereinafter, writing the cached data of the memory 11 into the backup area 32c of the BUD 30 in the event of a power failure in the storage device 1 will be sometimes referred to as memory backup.

Furthermore, in the CM 2, one or more temperature sensors 301 are provided in the vicinity of the SSD 30, and the temperature in the vicinity of the SSD 30 is measured using the temperature sensors 301. Hereinafter, the temperature in the vicinity of the SSD 30 will be sometimes referred to as a device ambient temperature. The temperature sensors 301 may be arranged in a place other than the vicinity of the SSD 30, and may be provided in the vicinity of the CPU 10, for example.

The nonvolatile storage medium 12 is a storage module that stores programs executed by the CPU 10, various kinds of data, and the like, and stores, for example, programs such as an OS, FW, and applications, and diverse kinds of data. The nonvolatile storage medium 12 may store dummy data to be written into the SSD 30 by a diagnostic processing unit 101 to be described later.

The nonvolatile storage medium 12 is, for example, an SSD. Note that an SCM or HOD may be used for the nonvolatile storage medium 12, and the nonvolatile storage medium 12 may be appropriately changed when implemented.

A program (backup control program) that achieves all or a part of diverse functions of the CM 2 may be stored in at least one of a read only memory (ROM) of the memory 11 and the nonvolatile storage medium 12. For example, the CPU 10 of the CM 2 can achieve the function as the CM 2 by reading the program as the FW stored in the ROM, expanding the read program into the memory 11, and executing the expanded program. Alternatively, the CPU 10 may achieve the function as the CM 2 by reading the program as the FW stored in the nonvolatile storage medium 12, expanding the read program into the memory 11, and executing the expanded program. The function as the CM 2 can include the functions of the diagnostic processing unit 101, an I/O command count determination unit 102, and a backup processing unit 103 to be described later.

The CPU 10 is a processing device that performs various controls and computations. The CPU 10 may be, for example, a multi-core processor (mufti-core CPU). The CPU 10 achieves various functions by executing an OS or a program stored in the memory 11 or the nonvolatile storage medium 12 or the like.

For example, in the present embodiment, the CPU 10 fulfills the functions as the diagnostic processing unit 101, the I/O command count determination unit 102, and the backup processing unit 103 illustrated in FIG. 2 by executing the backup control program (illustration omitted).

Note that the program (backup control program) for achieving the functions as the diagnostic processing unit 101, the I/O command count determination unit 102, and the backup processing unit 103 is provided, for example, in a form recorded in a computer-readable recording medium such as a flexible disk, a compact disc (CD) (CD-ROM, CD-recordable (R), CD-rewritable (RW), or the like), a digital versatile disc (DVD) (DVD-ROM, DVD-random access memory (RAM), DVD-R, DVD+R, DVD-RW, DVD+RW, HD DVD, or the like), a Blu-ray disc, a magnetic disc, an optical disc, or a magneto-optical disk. Then, a computer storage control device, a storage module management program, and the computer-readable recording medium on which the storage module management program is recorded (the CM 2 and the CPU 10) are used in such a manner that the program is read from the recording medium, and transferred to and stored in an internal storage module or an external storage module. Furthermore, the program may be recorded in, for example, a storage module (recording medium) such as a magnetic disc, an optical disc, or a magneto-optical disk, and provided from the storage module to the computer via a communication path.

When the functions as the diagnostic processing unit 101, the I/O command count determination unit 102, and the backup processing unit 103 are achieved, the program stored in the internal storage module (the RAM or the ROM of the memory 11 in the present embodiment) is executed by a microprocessor (the CPU 10 in the present embodiment) of the computer. At this time, the computer may read and execute the program recorded in the recording medium.

—Diagnostic Processing Unit 101—

The diagnostic processing unit 101 diagnoses a nonvolatile memory mounted on the SSD 30 and acquires a performance deterioration occurrence condition and deterioration characteristics relating to the SSD 30.

For example, the diagnostic processing unit 101 acquires information on a cumulative write data amount and a running time from the SSD 30 when the power of the storage device 1 is turned on and off. The diagnostic processing unit 101 performs a diagnostic process every time the cumulative write data amount or the running time exceeds a predetermined amount (threshold value). The diagnostic process is performed while normal operation is maintained (during normal operation) in which the CM 2 is supplied with power from an external power source.

The diagnostic processing unit 101 sets the number of I/O commands issued per unit time in regard to writing of data into the SSD 30. Hereinafter, the number of I/O commands that have been issued may be referred to as the I/O command count. The I/O command count per unit time is an index representing the I/O performance of the SSD 30, and represents the write load on the SSD 30. The I/O command count per unit time may be called transaction load or transaction performance.

For example, the diagnostic processing unit 101 adjusts the number of I/O commands issued per unit time by gradually limiting the time until the completion is notified in response to the command input from the CPU 10. Furthermore, it is assumed that the time until the completion notification is transmitted (completion notification waiting time) can be regulated from the outside. Note that the method for adjusting the number of I/O commands issued per unit time is not limited to this example, and may be modified in various ways when implemented.

In the storage device 1, a plurality of types of I/O command counts may be prepared in advance as the I/O command count per unit time. For example, the diagnostic processing unit 101 selects the I/O command count per unit time from among three types, namely, 20, 60, and 100 (unit: times/nsec) to switch therebetween. Hereinafter, the number of I/O commands issued per unit time may be referred to as a load condition. Note that the unit of the I/O command count per unit time may be, for example, times/sec, and may be appropriately changed when implemented.

The diagnostic processing unit 101 continuously writes the dummy data into consecutive addresses in the backup area 32c (see FIG. 2) of the SSD 30 to be diagnosed. The dummy data may have, for example, a test data pattern used in a benchmark test, or actual data stored in the storage device 1 may be used; the dummy data may be appropriately changed when implemented.

Furthermore, the diagnostic processing unit 101 measures the cumulative write data amount of the dummy data, the device ambient temperature, and the write performance (write size rate or transfer rate per unit time) in parallel with such continuous writing of the dummy data. For example, the diagnostic processing unit 101 diagnoses the write performance of the SSD 30 during normal operation of the CM 2.

When finding that the write performance has deteriorated below a predetermined threshold value, the diagnostic processing unit 101 cancels writing the dummy data and ends the above measurement. The write performance threshold value may be, for example, a value at which the average data transfer rate coincides with a predetermined ratio (for example, 90%) of the steady-state rate from the start of writing, or may be a predetermined value set in advance. This threshold value may be appropriately changed when implemented.

It is probable that thermal throttling was activated when the write performance of the SSD 30 deteriorated below a predetermined threshold value. When finding that the write performance has deteriorated below the predetermined threshold value in this manner, the diagnostic processing unit 101 saves the cumulative write data amount (Mmax) and the device ambient temperature (Tmax) at the time point when the writing of dummy data was canceled, in a predetermined storage area of the memory 11 or the nonvolatile storage medium 12 or the like.

The diagnostic processing unit 101 writes the dummy data into the backup area 32c of the SSD 30, measures the cumulative write data amount of the dummy data, the device ambient temperature, and the write performance, and stores the cumulative write data amount (Mmax) and the device ambient temperature (Tmax) as described above a plurality of times separately by switching between the I/O command counts per unit time.

This means that the diagnostic processing unit 101 writes dummy data into the SSD 30 and performs the diverse measurements as described above for each of a plurality of types of I/O command counts (load conditions) per unit time.

For example, the diagnostic processing unit 101 performs storage control to write the dummy data into the backup area 32c of the SSD 30, measure the cumulative write data amount of the dummy data, the device ambient temperature, and the write performance, and store the cumulative write data amount (Mmax) and the device ambient temperature (Tmax), for each of I/O command counts per unit time, namely, 20, 60, and 100.

Figure 4:
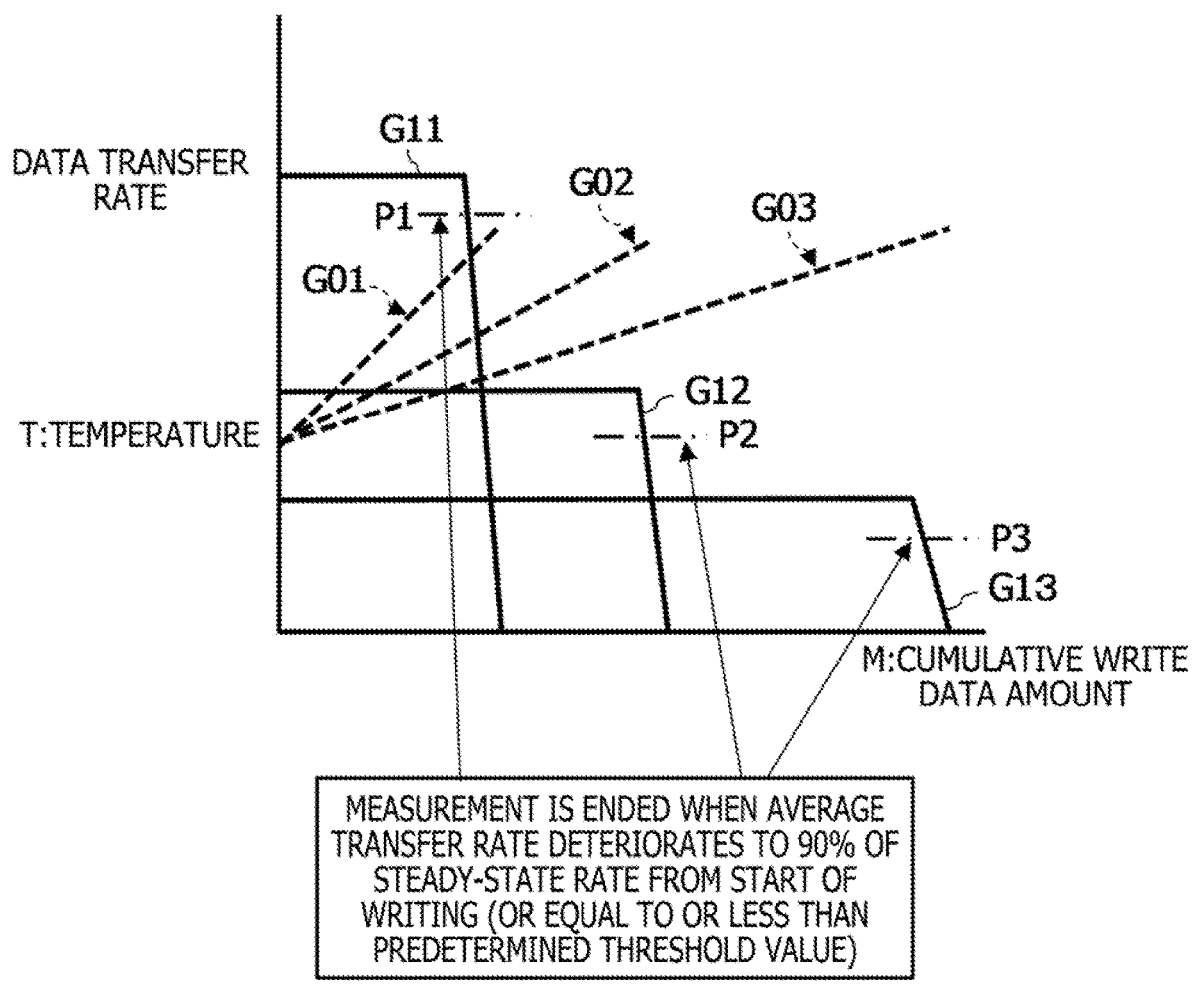
FIG. 4 is a graph representing information acquired by a diagnostic processing unit of the storage device as an example of the embodiment.

FIG. 4 is a graph representing information acquired by the diagnostic processing unit 101 of the storage device 1 as an example of the embodiment.

In FIG. 4, the horizontal axis represents the cumulative write data amount, and the vertical axis represents the data transfer rate and temperature.

For example, FIG. 4 illustrates graphs G01 to G03 (see the broken lines in FIG. 4) indicating the relationships between the cumulative write data amount and the device ambient temperature, and graphs G11 to G13 (see the solid line graphs in FIG. 4) indicating the relationships between the cumulative write data amount and the data transfer rate (write performance).

Here, the graph G01 represents the relationship between the cumulative write data amount and the device ambient temperature in a data transfer in which the number of I/O commands issued per unit time is 100. Furthermore, the graph G02 represents the relationship between the cumulative write data amount and the device ambient temperature in a data transfer in which the number of I/O commands issued per unit time is 60. The graph G03 represents the relationship between the cumulative write data amount and the device ambient temperature in a data transfer in which the number of I/O commands issued per unit time is 20.

Each of these graphs G01 to G03 indicates that the device ambient temperature rises as the cumulative write data amount is increased by writing data into the SSD 30.

Then, for example, it can be seen that the larger the number of I/O commands issued per unit time, the smaller the amount of data that can be written into the SSD 30 (cumulative write data amount) (see the graph G01). On the other hand, it can be seen that the smaller the number of I/O commands issued per unit time, the larger the amount of data that can be written into the SSD 30 (cumulative write data amount) (see the graph G03).

The graph G11 represents the relationship between the cumulative write data amount and the data transfer rate when the number of I/O commands issued per unit time is 100. Furthermore, the graph G12 represents the relationship between the cumulative write data amount and the data transfer rate when the number of I/O commands issued per unit time is 60. Moreover, the graph G13 represents the relationship between the cumulative write data amount and the data transfer rate when the number of I/O commands issued per unit time is 20.

Each of these graphs G11 to G13 indicates that data is written into the SSD 30 at a fixed data transfer rate (steady-state rate), and the cumulative write data amount increases according to this writing of data, and the data transfer rate, which had been shifted at a steady-state rate, deteriorates sharply, This sharp deterioration in data transfer rate indicates the occurrence of thermal throttling.

For example, it can be seen that the larger the number of I/O commands issued per unit time, the faster the data transfer rate, and the earlier the timing at which the thermal throwing is triggered, and as a result, the cumulative write data amount is smaller (see the graph G11). On the other hand, it can be seen that the smaller the number of I/O commands issued per unit time, the slower the data transfer rate, and the later the timing at which the thermal throttling is triggered, and the larger the cumulative write data amount (see the graph G13).

In addition, threshold values P1 to P3 for detecting the occurrence of thermal throttling are individually set in the respective graphs G01 to G03 (see the dashed-dotted lines in FIG. 4). For example, the threshold value P1, the threshold value P2, and the threshold value P3 are set in the graph G11, the graph G12, and the graph G13, respectively. The threshold values P1 to P3 individually have, for example, values at 90% of the respective steady-state rates of the graphs G11 to G13. Note that the threshold values are not limited to this example, and may be appropriately changed when implemented.

The diagnostic processing unit 101 concludes that thermal throttling has occurred, when finding that the data transfer rate coincides with the threshold values or lower in the graphs G11 to G13 while writing dummy data under each load condition, and ends the measurement of the cumulative write data amount, the device ambient temperature, and the write performance.

The diagnostic processing unit 101 saves the maximum value of the cumulative write data amount (Mmax) and the maximum value of the device ambient temperature (Tmax) at the time point when thermal throttling was detected, in a predetermined storage area of the memory 11 or the like.

As described above, the diagnostic processing unit 101 has an information collecting function of writing data into consecutive addresses in the storage area of the SSD 30 and also recording the temperature measured by the temperature sensor 301 in a predetermined storage area of the memory 11.

Furthermore, the diagnostic processing unit 101 creates I/O command count reference information used for selecting the I/O command count at the time of memory backup, based on the measurement result.

The relationship between a cumulative write size (M) and an ambient temperature (T) can be represented by following mathematical formula (1). In the formula, the device ambient temperature (T0) at the start of diagnosis (at the time of M=0) is assumed.

$$T=\{(T\max-T0)/M\max\}M+T0 \qquad (1)$$

An upper limit (Mmax−M) of the memory size that can be written without performance degradation with respect to the temperature T at the start of writing the dummy data can be represented by following formula (2). This formula (2) is obtained by converting above formula (1) in terms of the temperature (T) at the start of writing the dummy data with respect to the upper limit threshold value (Mmax−M) of the memory size that can be written without performance degradation.

$$M\max-M=-(M\max\ T+T\max)/(T\max-T0) \qquad (2)$$

Figure 5:
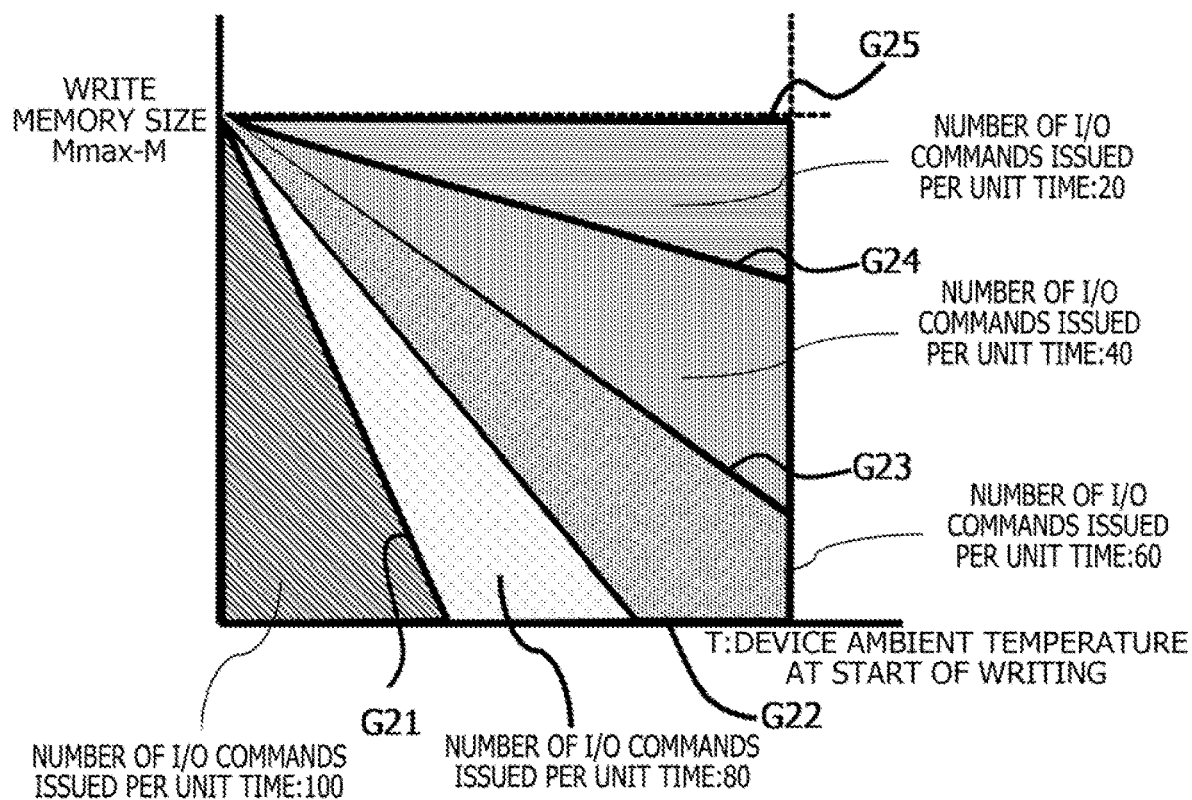
FIG. 5 is a diagram exemplifying I/O command count reference information in the storage device as an example of the embodiment.

FIG. 5 is a diagram exemplifying the I/O command count reference information in the storage device 1 as an example of the embodiment. FIG. 5 illustrates an example in which the number of I/O commands issued per unit time is each of 20, 40, 60, 80, and 100.

In this FIG. 5, the horizontal axis represents the device ambient temperature (T) at the start of writing, and the vertical axis represents the write memory size (Mmax−M).

For example, FIG. 5 illustrates graphs G21 to G25 indicating the relationships between the device ambient temperature at the start of writing and the write memory size. Each of these graphs G21 to G25 represents above formula (2).

Here, the graph G25 represents the relationship between the device ambient temperature at the start of writing and the amount of data that can be written into the SSD 30 (write memory size) in a data transfer in which the I/O command count per unit time is 20. The amount of data that can be written into the SSD 30 when data transfer with the I/O command count 20 per unit time is performed is indicated as an area below this graph G25.

The graph G24 represents the relationship between the device ambient temperature at the start of writing and the amount of data that can be written into the SSD 30 (write memory size) in a data transfer in which the I/O command count per unit time is 40. The amount of data that can be written into the SSD 30 when data transfer with the I/O command count 40 per unit time is performed is indicated as an area below this graph G24.

The graph G23 represents the relationship between the device ambient temperature at the start of writing and the amount of data that can be written into the SSD 30 (write memory size) in a data transfer in which the I/O command count per unit time is 60. The amount of data that can be written into the SSD 30 when data transfer with the I/O command count 60 per unit time is performed is indicated as an area below this graph G23.

The graph G22 represents the relationship between the device ambient temperature at the start of writing and the amount of data that can be written into the SSD 30 (write memory size) in a data transfer in which the I/O command count per unit time is 80. The amount of data that can be written into the SSD 30 when data transfer with the I/O command count 80 per unit time is performed is indicated as an area below this graph G22.

The graph G21 represents the relationship between the device ambient temperature at the start of writing and the amount of data that can be written into the SSD 30 (write memory size) in a data transfer in which the I/O command count per unit time is 100. The amount of data that can be written into the SSD 30 when data transfer with the I/O command count 100 per unit time is performed is indicated as an area below this graph G21.

Furthermore, in this I/O command count reference information illustrated in FIG. 5, a larger I/O command count per unit time is preferentially applied for a portion where the respective areas below the plurality of graphs G21 to G25 overlap. With this configuration, in the I/O command count reference information exemplified in FIG. 5, a coordinate space represented by the device ambient temperature (T) at the start of writing and the write memory size (Mmax M) is sectioned by the respective load conditions, namely, the I/O command counts 20, 40, 60, 80, and 100 per unit time.

In the I/O command count reference information, these areas indicating the I/O command counts per unit time each indicate an I/O command count per unit time for achieving memory backup in a short time without causing the occurrence of thermal throttling, with respect to a combination of the device ambient temperature (T) at the start of writing and the write memory size (Mmax−M). The I/O command count reference information corresponds to relational information indicating the relationship between a write data size (write memory size), an environmental temperature (the device ambient temperature at the start of writing), and a write load (the I/O command count per unit time).

The diagnostic processing unit 101 writes the dummy data into the SSD 30 with each of a plurality of types of the I/O command counts (write loads) per unit time, and collects the cumulative write data amount, the environmental temperature, and the write performance while the dummy data is being written. The diagnostic processing unit 101 creates the I/O command count reference information (relational information) by creating a relational expression that represents the relationship between the write data size (write memory size) and the environmental temperature (the device ambient temperature at the start of writing) for each of the plurality of types of write loads (I/O command counts).

With this configuration, in the I/O command count reference information exemplified in FIG. 5, by examining which I/O command count has an area to which the coordinates corresponding to a combination of the device ambient temperature at the start of data writing into the SSD 30 and the maximum value of the write memory size belong, an I/O command count per unit time suitable for writing backup data into the SSD 30 may be determined.

As described above, the diagnostic processing unit 101 writes data into consecutive addresses in the storage area of the SSD 30, and also records the temperature measured using the temperature sensor 301 in a predetermined storage area of the memory 11. The diagnostic processing unit 101 creates the I/O command count reference information (relational information) indicating the relationship in the SSD 30 between the write data size (write memory size), the environmental temperature (the device ambient temperature at the start of writing), and the write load (the I/O command count per unit time).

—I/O Command Count Determination Unit 102—

The I/O command count determination unit 102 determines the I/O command count per unit time when the backup processing unit 103 to be described later executes memory backup. The I/O command count determination unit 102 refers to the I/O command count reference information to determine an I/O command count per unit time for ensuring that thermal throwing will not occur while the memory backup is being performed.

When this I/O command count reference information exemplified in FIG. 5 is referred to, the cached data size of the memory 11 to be backed up is assumed as the write memory size, and the device ambient temperature at the start of backup is assumed as the device ambient temperature at the start of writing. Note that the cached data size of the memory 11 may be monitored at any time by, for example, a monitoring function (not illustrated) and stored in a predetermined storage area of the memory 11 or the non-volatile storage medium 12. The cached data size of the memory 11 can be grasped by a known technology, and the description thereof will be omitted.

In the I/O command count reference information, the I/O command count determination unit 102 examines which I/O command count has an area that corresponds to the combination of these write memory size and device ambient temperature at the start of writing. In the I/O command count reference information, the I/O command count determination unit 102 determines an I/O command count to which the combination of the write memory size and the device ambient temperature at the start of writing belongs, as the I/O command count per unit time during backup execution.

The I/O command count determination unit 102 corresponds to a determination unit that refers to the I/O command count reference information at the time of memory backup that stores cached data (backup target data) in the SSD 30, to determine the I/O command count (write load) per unit time.

The I/O command count determination unit 102 refers to the I/O command count reference information (relational information) based on the environmental temperature and the data size of the backup target data at the time of detection of a power failure in the CM 2, and determines an I/O command count (write load) per unit time that corresponds to the combination of the environmental temperature and the data size at the time of detection of the power failure.

—Backup Processing Unit 103—

The backup processing unit 103 executes memory backup that writes the cached data of the memory 11 that is the backup target data into a predetermined storage area of the SSD 30 in the event of a power failure in the storage device 1.

When the CM 2 detects the loss of the power source (external power source) that supplies power to the CM 2 (detects a power failure), the backup processing unit 103 uses standby power supplied from the BPSU 15 to back up the memory 11 in the backup area 32c of the BUD 30. The data to be backed up can be, for example, valid data stored in the memory 11 when a power failure is detected.

Note that, when the memory backup is completed, the CM 2 can store, for example, an operation stop factor (power disconnection factor) such as "power failure" in the log writing area 32b of the BUD 30, or another nonvolatile memory or the like before stopping the operation. Furthermore, when the external power is re-injected into the CM 2 because of the recovery of the external power source, the backup processing unit 103 can refer to the most recent operation stop factor, and when the most recent operation stop factor is a power failure, write the data back to the memory 11 from the backup area 32c of the BUD 30. With this configuration, the CM 2 can resume the system operation after restoring the state of the memory 11 when the power failure was detected.

As described above, the backup processing unit 103 is an example of a backup unit that executes memory backup for data in the memory 11 to the backup area 32c using the BPSU 15 when a power failure in the CM 2 has occurred.

Furthermore, the backup processing unit 103 executes memory backup with the I/O command count per unit time determined by the I/O command count determination unit 102.

The backup processing unit 103 adjusts the number of I/O commands issued per unit time by performing I/O command division control that gradually limits the time until the completion is notified in response to the command input from the CPU 10. Note that it is assumed that the time until the completion notification can be regulated. Such I/O command division control can be achieved by a known technology, and the detailed description thereof will be omitted.

(B) Operation

Figure 6:
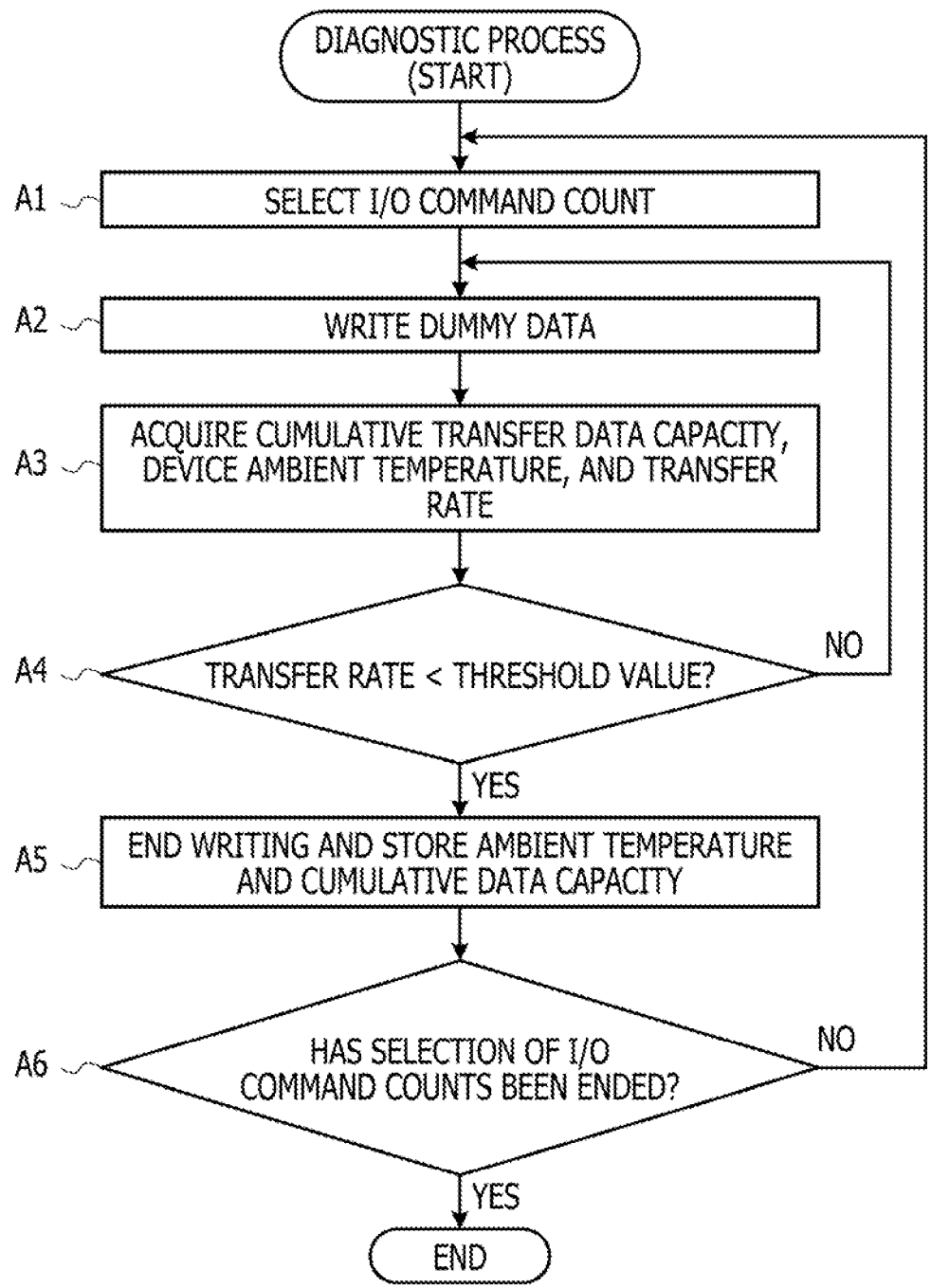
FIG. 6 is a flowchart for explaining a process by the diagnostic processing unit of the storage device as an example of the embodiment.

The process by the diagnostic processing unit 101 of the storage device 1 as an example of the embodiment configured as described above will be described with reference to the flowchart (steps A1 to A6) illustrated in FIG. 6.

In step A1, the diagnostic processing unit 101 selects one I/O command count per unit time from among a plurality of types of I/O command counts, per unit time prepared in advance.

In step A2, the diagnostic processing unit 101 writes the dummy data into the SSD 30 with a transaction load of the I/O command count per unit time selected in step A1.

In step A3, the diagnostic processing unit 101 measures the cumulative write data amount of the dummy data, the device ambient temperature, and the transfer rate (write performance) while writing the dummy data into the SSD 30.

In step A4, the diagnostic processing unit 101 compares the data transfer rate in the SSD 30 with the threshold value, and confirms whether or not the transfer rate is less than the threshold value. As a result of the confirmation, when the transfer rate is equal to or higher than the threshold value (see the NO route in step A4), the process returns to step A2.

Alternatively, as a result of the confirmation, when the transfer rate is less than the threshold value, which means that, when the occurrence of thermal throttling is found in the SSD 30 (see the YES route in step A4), the process proceeds to step A5.

In step A5, the diagnostic processing unit 101 ends the writing of the dummy data into the SSD 30, and saves the cumulative write data amount (Mmax) and the device ambient temperature (Tmax) in a predetermined storage area of the memory 11 or the nonvolatile storage medium 12 or the like.

In step A6, the diagnostic processing unit 101 confirms whether or not the processes in above steps A2 to A5 have been performed for all the I/O command counts per unit time. When the processes have not been completed for all the I/O command counts per unit time (see the NO route in step A6), the process returns to step A1, and an unselected I/O command count per unit time is selected such that the subsequent processes are repeatedly performed.

When the processes have been performed for all the I/O command counts per unit time (see the YES route in step A6), the process is ended assuming that the selection of the I/O command counts has been ended.

Figure 7:
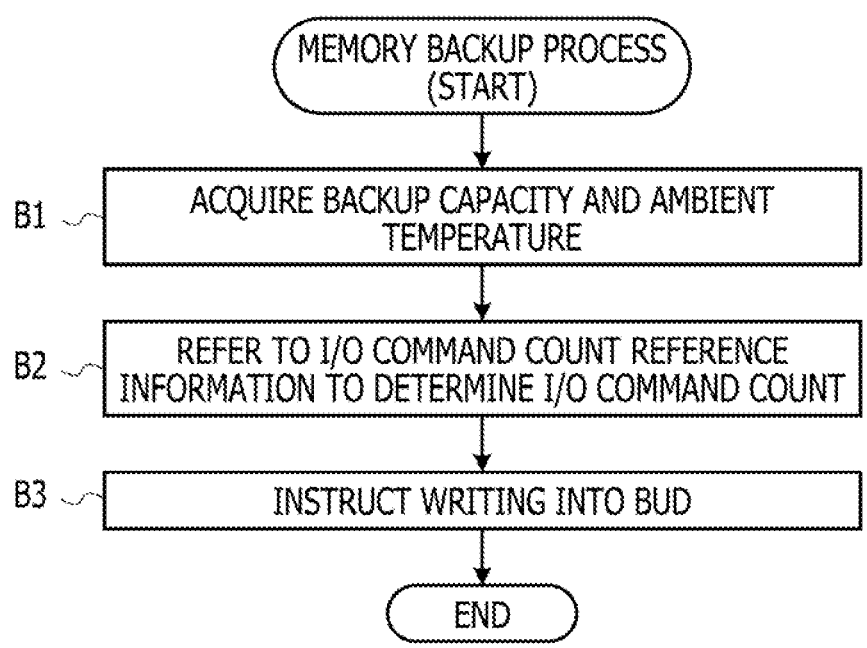
FIG. 7 is a flowchart for explaining a memory backup process in the storage device as an example of the embodiment.

Next, the memory backup process in the storage device 1 as an example of the embodiment will be described with reference to the flowchart (steps B1 to B3) illustrated in FIG. 7.

When the occurrence of a power failure is detected in the CM 2, in step B1, the I/O command count determination unit 102 acquires a backup capacity (the cached data size of the memory 11). Furthermore, the I/O command count determination unit 102 acquires the device ambient temperature measured using the temperature sensor 301. The I/O command count determination unit 102 may store these acquired backup capacity and device ambient temperature in the memory 11.

In step B2, the I/O command count determination unit 102 refers to the I/O command count reference information to determine the I/O command count per unit time when the backup processing unit 103 executes the memory backup.

For example, for the I/O command count, assuming that the backup capacity acquired in step B1 is the write memory size, the number of I/O commands issued per unit time to which the combination of the write memory size and the device ambient temperature at the start of writing belongs is specified (determined) in the I/O command count reference information.

The I/O command count determination unit 102 may store the determined number of I/O commands issued per unit time in a predetermined storage area of the memory 11.

In step B3, the backup processing unit 103 executes memory backup that writes the cached data of the memory 11 into a predetermined storage area of the SSD 30. The backup processing unit 103 executes the memory backup with the I/O command count per unit time determined by the I/O command count determination unit 102.

When the memory backup is completed, the CM 2 can store, for example, the operation stop factor (power disconnection factor) such as "power failure" in the log writing area 32b of the BUD 30, or another nonvolatile memory or the like before stopping the operation.

(C) Effects

As described above, according to the storage device 1 as an example of the embodiment, the diagnostic processing unit 101 creates the I/O command count reference information by diagnosing the write performance of the BUD 30.

The I/O command count determination unit 102 determines an I/O command count per unit time for achieving memory backup in a short time without the occurrence of thermal throwing, by referring to this created I/O command count reference information.

The backup processing unit 103 may suppress the occurrence of thermal throttling and perform memory backup in a short time, by executing the memory backup process such that this determined I/O command count per unit time is obtained.

This means that, according to the storage device 1, the write performance for memory backup to the BUD 30 may be guaranteed and the occurrence of thermal throttling may be avoided. Consequently, the BUD 30 may be used efficiently.

Furthermore, too much cooling to avoid thermal throttling is not supposed to be performed, and power consumption for the cooling process may be reduced.

(D) Others

The disclosed technique is not limited to the embodiment described above, and various modifications may be made without departing from the spirit of the present embodiment. Each of the configurations and processes of the present embodiment can be selected or omitted as needed or may be appropriately combined.

For example, in the above-described embodiment, as illustrated in FIG. 1, each CM 2 includes one BUD 30, but the embodiment is not limited to this example. Each CM 2 may include two or more BUDs 30.

When the CM 2 includes a plurality of BUDs 30 in this manner, it is desirable that the diagnostic processing unit 101 separately write the dummy data and measure diverse kinds of information for each BUD 30, and create the I/O command count reference information for each BUD 30.

Then, when a power failure is detected in the CM 2, it is desirable that the I/O command count determination unit 102 determine the I/O command count per unit time for each BUD 30 by referring to the I/O command count reference information. Furthermore, it is desirable that the backup processing unit 103 perform memory backup for each BUD 30 using the I/O command count per unit time determined for each BUD 30.

In addition, in the above-described embodiment, the storage device 1 includes two CMs 2, but the storage device 1 is not limited to this example. The storage device 1 may include one or three or more CMs 2, and may be modified in various ways when implemented.

Furthermore, the present embodiment can be implemented and manufactured by those skilled in the art according to the above-described disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control device, comprising:
a memory; and
a processor coupled to the memory and the processor configured to:
identify a storage device to store a target data to be backed up;
generate relational information which indicates a relationship between a write data size, an environmental temperature;
write loads by using write performance of the storage device when an operation of the storage control device is normal, and when storing the target data in the storage device, determine one of the write loads by using the relational information;
write dummy data into the storage device with each of a plurality of types of the write loads;
collect a cumulative write data amount, the environmental temperature, and the write performance while the dummy data is being written;
create a relational expression that represents a relationship between the write data size and the environmental temperature for each of the plurality of types of the write loads; and
generate the relational information based on the relational expression.

2. The storage control device according to claim 1, wherein the processor configured to: refer to the relational information based on the environmental temperature and a data size of the backup target data at a time of detection of a power failure in the storage control device, and determine one of the write loads that corresponds to a combination of the environmental temperature and the data size at the time of the detection of the power failure.

3. A non-transitory computer-readable storage medium storing a program that causes a computer to execute a process, the process comprising:
- identifying a storage device to store a target data to be backed up;
- generating relational information which indicates a relationship between a write data size, an environmental temperature, and write loads by using write performance of the storage device when an operation of the storage control device is normal;
- when storing the target data in the storage device, determining one of the write loads by using the relational information;
- writing dummy data into the storage device with each of a plurality of types of the write loads;
- collecting a cumulative write data amount, the environmental temperature, and the write performance while the dummy data is being written;
- creating a relational expression that represents a relationship between the write data size and the environmental temperature for each of the plurality of types of the write loads; and
- generating the relational information based on the relational expression.

4. The non-transitory computer-readable storage medium according to claim 3, the process comprising: refer to the relational information based on the environmental temperature and a data size of the backup target data at a time of detection of a power failure in the storage control device; and determine one of the write loads that corresponds to a combination of the environmental temperature and the data size at the time of the detection of the power failure.

5. A storage control method to be executed by a computer, the storage control method comprising:
- identifying a storage device to store a target data to be backed up;
- generating relational information which indicates a relationship between a write data size, an environmental temperature, and write loads by using write performance of the storage device when an operation of the storage control device is normal;
- when storing the target data in the storage device, determining one of the write loads by using the relational information;
- writing dummy data into the storage device with each of a plurality of types of the write loads;
- collecting a cumulative write data amount, the environmental temperature, and the write performance while the dummy data is being written;
- creating a relational expression that represents a relationship between the write data size and the environmental temperature for each of the plurality of types of the write loads; and
- generating the relational information based on the relational expression.

* * * * *